Figures 1, 2:
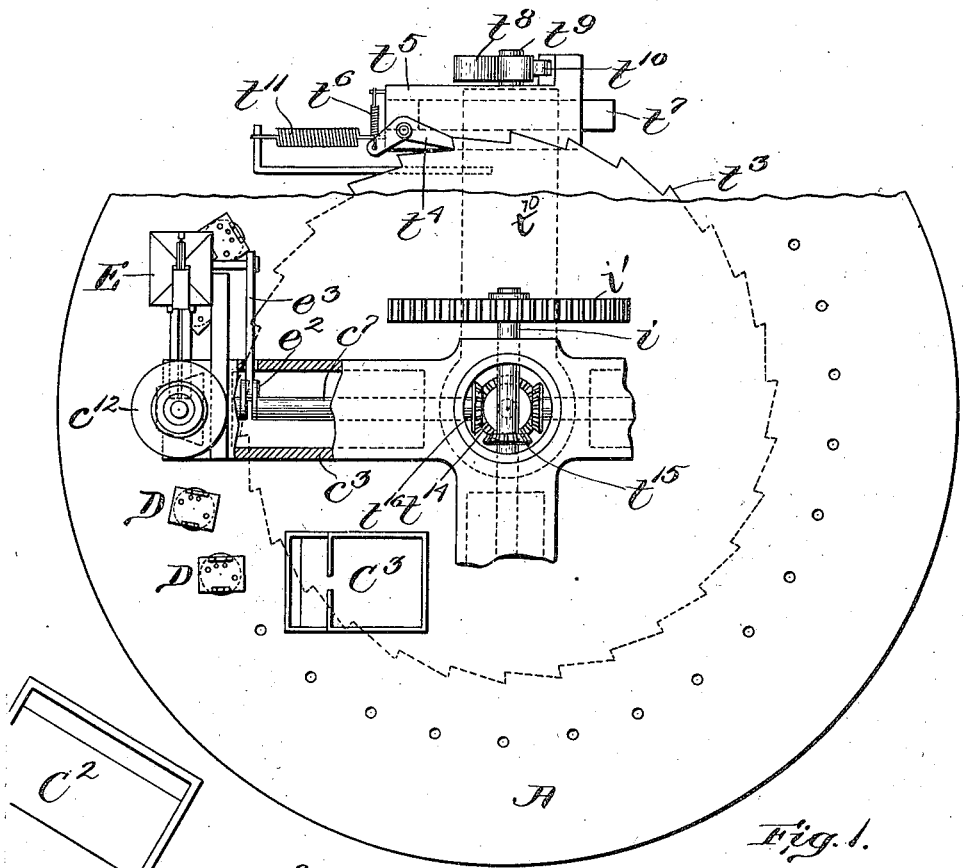

N. MARSHALL.
ASSEMBLING APPARATUS.
APPLICATION FILED SEPT. 20, 1905.

922,437.

Patented May 18, 1909.
2 SHEETS—SHEET 1.

Witnesses:
Katharine A. Dugan
Geo. N. Goddard

Inventor:
Norman Marshall
By Ira L. Fish, Attorney.

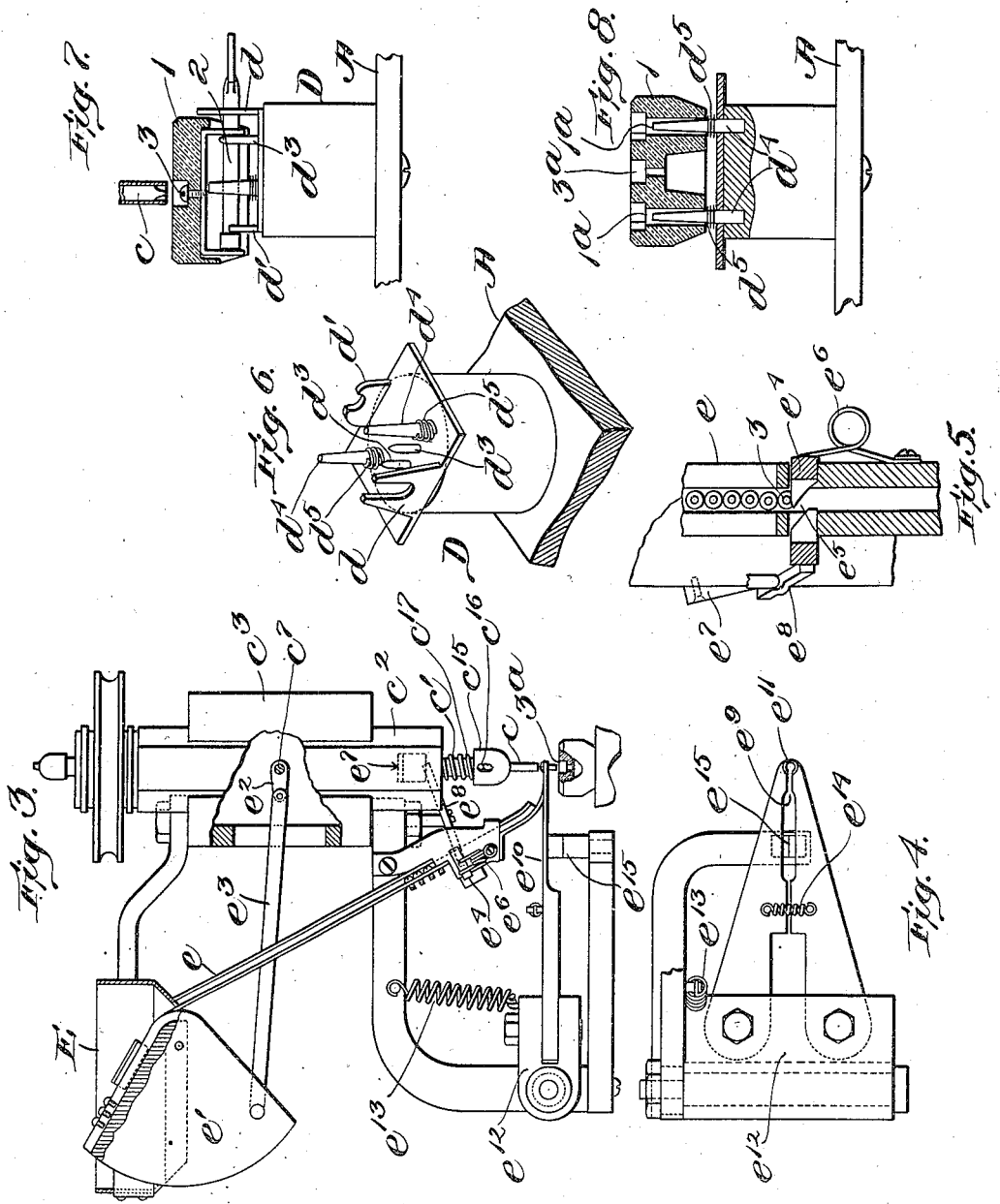

UNITED STATES PATENT OFFICE.

NORMAN MARSHALL, OF NEWTON, MASSACHUSETTS.

ASSEMBLING APPARATUS.

No. 922,437.      Specification of Letters Patent.      Patented May 18, 1909.

Original application filed January 19, 1905, Serial No. 241,784. Divided and this application filed September 20, 1905. Serial No. 279,286.

*To all whom it may concern:*

Be it known that I, NORMAN MARSHALL, citizen of the United States, and resident of Newton, county of Middlesex, Massachusetts, have invented certain new and useful Improvements in Assembling Apparatus, of which the following is a specification.

The invention relates to a machine or apparatus for use in assembling the parts of electric devices such for instance as switches, lamp sockets, cut-outs etc., and its object is to provide for the rapid and economical assembling and securing together of the parts of the device being operated upon. Heretofore it has been customary in assembling the parts of such devices to perform manually the various operations incident to bringing the parts into proper relation and driving the securing screws. This manner of assembling and securing together the parts requires skill and dexterity on the part of the operators and also results in ununiform and often times defective work.

In practicing the present invention the operation of driving the screws for securing the parts together is performed automatically while the parts to be secured together are supported and carried by a series of jigs. The jigs travel successively into position to present the parts carried thereby to the screw driving mechanism which operates to drive the screws during the interval between successive movements of the carrier on which the jigs are mounted. The parts to be assembled are delivered by chutes or conveyers into convenient position to be applied to the jigs and may be placed upon the jigs either automatically or by the operator. The feeding of the screws may also be performed in either manner. I prefer however, to feed the screws automatically and to provide for the manual placing of the parts in position upon the jigs.

For the purpose of illustrating the various features of the invention in the forms in which I prefer to use them, I have shown in the accompanying drawings a mechanism designed more especially for use in assembling parts of an incandescent lamp socket, and have shown this mechanism as forming a part of a machine in which other operations incident to assembling the parts of a socket are performed.

In these drawings Figure 1 is a plan view of so much of the machine as is required to illustrate the mechanisms embodying the features of the present invention; Fig. 2 is an elevation partly in section; Figs. 3, 4 and 5 are details of the screw feeding and driving mechanisms, and Figs. 6, 7 and 8 are details showing the construction of the jig for supporting the base and key frame of a socket.

The first operation in assembling the parts of an incandescent lamp socket is the securing of the key mechanism to the porcelain base by means of a screw passing through the base and into the key frame. This operation is performed in the machine shown in the drawings by a screw driving mechanism to which the parts are presented by the series of jigs D. The jigs are secured upon rotary carrying table A which is intermittently rotated to bring the jigs successively into register with the screw driving mechanism.

The porcelain bases 1 are conveyed to the operator by a chute $C^2$ the delivery end of which is adjacent to the table A and the key mechanisms 2 are conveyed to the operator by a chute $C^3$ the delivery end of which is above the table A adjacent to the path of travel of the jigs D. By these chutes therefore, the two parts, namely the porcelain base and the key mechanism are delivered so that they may be conveniently and quickly applied to the jigs D by an operator as the jigs pass successively during the operation of the machine.

The jigs D are provided with two upwardly projecting plates $d\ d'$ provided with vertical slots in which the key shaft of the key mechanism fits and are also provided with two upwardly projecting pins $d^3$ for embracing the key shaft and engaging one end of the key frame as indicated in Fig. 7. The key mechanism is thus held in place on the jig by means of the fingers formed by the sides of the slots in plates $d\ d'$ and by the pins $d^3$, the pins $d^3$ engaging one end of the key frame and the fingers on the plate $d'$ engaging the inner side of the contact block carried by the key shaft.

The porcelain base 1 may be positioned by its engagement with the base of the key frame but is preferably held in position on the jig D and in proper relation to the key mechanism by means of two upwardly projecting pins $d^4$ arranged to engage the holes $1^a$ in the porcelain base. When in position on the jig the porcelain base is supported upon springs $d^5$ so that the base is held somewhat above the key frame. This enables the screw to project through the hole in the base so that it is accurately held by the hole in position to register with and enter the screw hole in the frame as the screw driving spindle forces the screw and base downward. The springs yield as the screw is forced down by the screw driver and is driven home.

As the table A revolves an operator places a key mechanism in position on each of the jigs D and also places a porcelain base on each of the jigs, the parts being held by the jigs in the relation shown in Fig. 7. While the table is at rest after each advance movement, the screw driving mechanism acts to drive the screw 3, thus securing the base and key mechanism together. The screw 3 may be dropped into the recess in the porcelain base by the operator who places the base and key mechanism on the jig but I prefer to provide mechanism for automatically feeding the screws.

The screw-driver $c$ is secured in a spindle $c'$ which is mounted to rotate in a vertically reciprocating slide $c^2$. The slide $c^2$ is mounted in suitable guides in an arm $c^3$ projecting from the central standard of the machine and is operated by a crank pin $c^4$ working in a transverse slot formed in the slide. The crank pin is carried by a disk $c^6$ secured to the outer end of a constantly rotating shaft $c^7$ and the lower side of the slot $c^5$ is held in engagement with the crank pin by means of a spring $c^8$ connected with the slide $c^2$ and tending to hold said slide in its upper position. The spindle $c'$ is yieldingly mounted in a shaft $c^9$ to which it is connected by means of a pin $c^{10}$ passing through the spindle and into longitudinal slots formed in the shaft $c^9$, the spindle being held in normal position with the pin against the lower end of the slots by means of a spring $c^{11}$. The shaft $c^9$ is continuously driven by means of a belt passing over a pulley $c^{12}$ which is frictionally connected with the shaft $c^9$ by friction disks $c^{13}$ interposed between the pulley and collars $c^{14}$ secured to the shaft. When the crank pin $c^4$ forces the slide $c^2$ downward the screw-driver $c$ engages the slot in the head of the screw 3 and drives said screw home. When the screw has been driven the pulley $c^{12}$ will slip with relation to the shaft and the spring $c^{11}$ will yield if necessary to accommodate any downward movement of the slide $c^2$ after the screw has been driven home. In order to insure the engagement of the screw driver with the head of the screw, a guard $c^{15}$ is mounted on the end of the spindle $c'$ and is provided with a recess at its lower end adapted to fit over the head of the screw. This guard is connected with the spindle by means of a pin $c^{16}$ engaging a slot in the guard and the guard is yieldingly held in its lower position by means of a spring $c^{17}$ which yields to allow the downward movement of the screw driver with relation to the guard after the guard has engaged the head of the screw.

The screws 3 are fed into position to be inserted in the recess $3^a$ in the porcelain by means of the devices shown in Figs. 3, 4 and 5. The screws are applied from a magazine or hopper E to a chute $e$ by means of a vibrating separator plate $e'$ of common and well known construction. The plate is continuously vibrated by means of a crank $e^2$ on the shaft $c^7$ connected by means of a link $e^3$ with the plate. Individual screws are separated from the series of screws in the chute $e$ by means of a reciprocating separator slide $e^4$ (Fig. 5). This slide is provided with a diagonal slot $e^5$ for the passage of the screws and is normally held in the position shown in Fig. 5 by means of the spring $e^6$. When in this position the slide $e^4$ sustains the series of screws in the chute $e$. When the slide $c^2$ descends the separator slide $e^4$ is moved toward the right in Fig. 5 by means of a cam $e^7$ secured to the slide $c^2$ and acting upon one end of a lever $e^8$ the opposite end of which engages the slide $e^4$. This movement of the slide $e^4$ brings the upper end of the inclined slot $e^5$ into register with the guideway in the chute $e$ so that the lower screw 3 enters the slot. When the slide $e^4$ returns to normal position upon the upward movement of the slide $c^2$ the lower end of the inclined slot $e^5$ is brought into register with the guideway in the chute $e$ so that this screw 3 passes down the guideway, the remaining screws being held back and supported by the slide $e^4$. The screw which passes down the guideway is directed by the lower end of the chute $e$ into a slot $e^9$ formed between two horizontal arms $e^{10}$ and passes to the outer end of these arms where its movement is arrested by the inwardly projecting ends $e^{11}$ of the arms. When in this position the screw 3 is directly above the recess $3^a$ in the porcelain base 1 which is under the screw driving mechanism and is in position to be engaged by the guard $c^{15}$ as the screw driving spindle descends. When the screw driver spindle descends therefore, the screw 3 is carried down into the recess $3^a$ and is screwed into the frame of the key mechanism by the screw driver. In order to accommodate this downward movement of the screw, the arms $e^{10}$ are carried by a pivoted frame $e^{12}$ which is yieldingly held in normal position with the arms $e^{10}$ against the lower end of the chute $e$ by a spring $e^{13}$. As the screw driving mechanism carries the screw downward, the frame $e^{12}$ yields against the tension of the spring $e^{13}$ so that the arms move downward with the screw. During this downward movement the arms are separated so as to disengage them from the under side of the screw head and thus enable the screw to pass between the arms and into the recess $3^a$. To enable the arms to be thus separated they are pivoted to the frame $e^{12}$ and are held yieldingly in normal position by means of a spring $e^{14}$ which connects said arms. The means for spreading the arms as they move downward consists of a wedge-shaped cam $e^{15}$ against which the inner sides of the arms ride as they move downward. By this mechanism a screw 3 is fed into position to enter the recess $3^a$ in the porcelain base at each upward movement of the spindle carrying slide $c^2$ and this screw is driven during the succeeding downward movement of the spindle carrying slide. During the upward movement of the spindle carrying slide $c^2$ the table A is moved a step forward to bring the succeeding porcelain base and key mechanism into position to receive the screw 3 and to be operated upon by the screw driving mechanism.

The shaft $c^7$ is driven from a shaft $i$ through a bevel gear $t^{15}$ which engages a gear $t^{14}$ secured to a vertical shaft $t^{12}$ and engaging a gear $t^{16}$ on the shaft $c^7$. The shaft $i$ is driven through a gear $i'$ from any suitable source of power.

Intermittent movement is imparted to the table A through a ratchet wheel $t^3$ secured to the under side of the table and having a number of teeth corresponding to the number of jigs on the table. This ratchet wheel is acted upon by a pawl $t^4$ pivoted to a slide $t^5$ and held in engagement with the ratchet wheel by a spring $t^6$. The slide is guided upon a bar $t^7$ mounted upon an arm $t^{70}$ which projects from the center standard for the table. The slide is reciprocated by a cam $t^8$ secured to a shaft $t^9$ and engaging a roller $t^{10}$ carried by the slide, the roller being held in engagement with the cam by a spring $t^{11}$. The shaft $t^9$ is driven from the vertical shaft $t^{12}$ through the gears $t^{13}$.

Without attempting to describe in detail the various modifications and constructions in which the features of my invention may be embodied, what I claim and desire to secure by Letters Patent is:—

1. An assembling apparatus having in combination, a screw driving mechanism, a series of jigs each provided with fingers for engaging the key frame of a socket and holding it in position with its base up, and with yielding supports for supporting the base of a socket above the frame, mechanism for intermittently bringing the jigs successively to the screw driving mechanism, and mechanism for operating the screw driving mechanism between the movements of the jigs.

2. A jig for assembling apparatus provided with fingers arranged to embrace the key shaft of a socket and to engage the key frame and maintain it in position to receive the porcelain base of the socket.

3. A jig for assembling apparatus provided with plates $d$ $d'$ slotted to receive the key shaft of a socket frame and with fingers $d^3$ for engaging the frame.

4. A jig for an assembling apparatus provided with fingers between which the key frame of a socket fits, and pins arranged to enter recesses in the socket base and position it with relation to the key frame.

5. A jig for an assembling apparatus provided with fingers between which the key frame of a socket fits, pins arranged to enter recesses in the socket base and position it with relation to the key frame, and spring for supporting the base above the key frame.

In witness whereof, I have hereunto set my hand, this 5th day of September 1905.

NORMAN MARSHALL.

Witnesses:
IRA L. FISH,
KATHARINE A. DUGAN.